Figure 1:
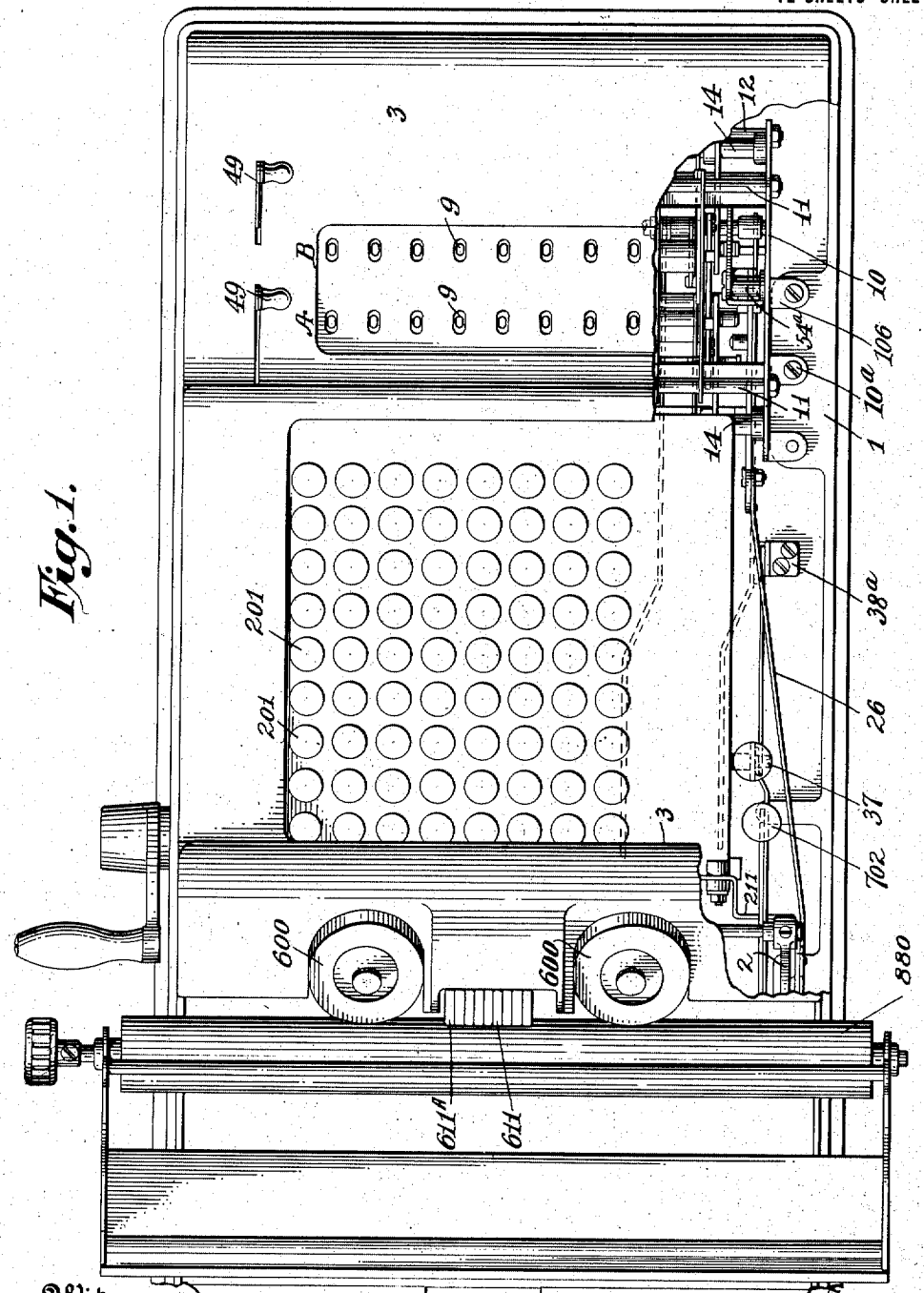

H. C. PETERS.
CALCULATOR.
APPLICATION FILED JUNE 3, 1915.

1,255,821.

Patented Feb. 5, 1918.
12 SHEETS—SHEET 4.

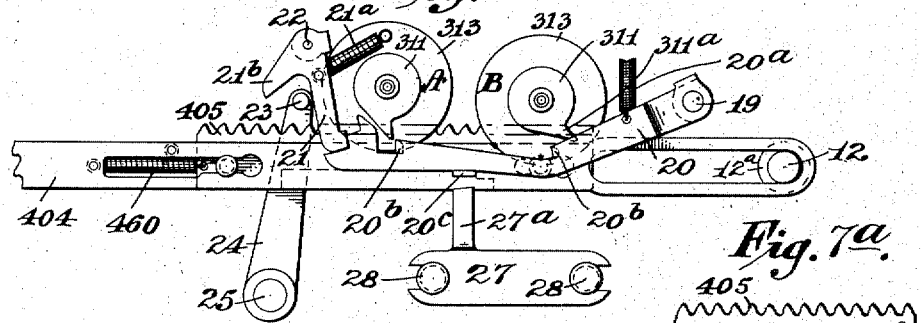
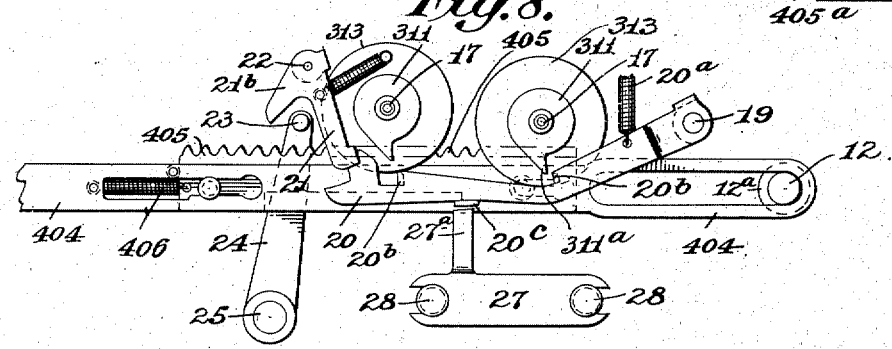
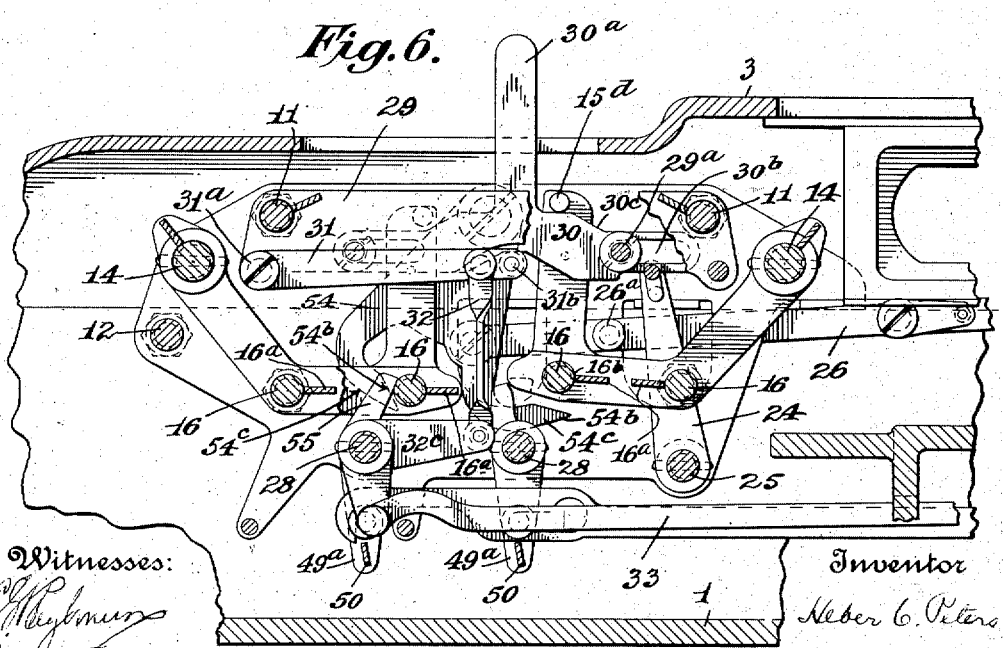

H. C. PETERS.
CALCULATOR.
APPLICATION FILED JUNE 3, 1915.
1,255,821.
Patented Feb. 5, 1918.
12 SHEETS—SHEET 6.
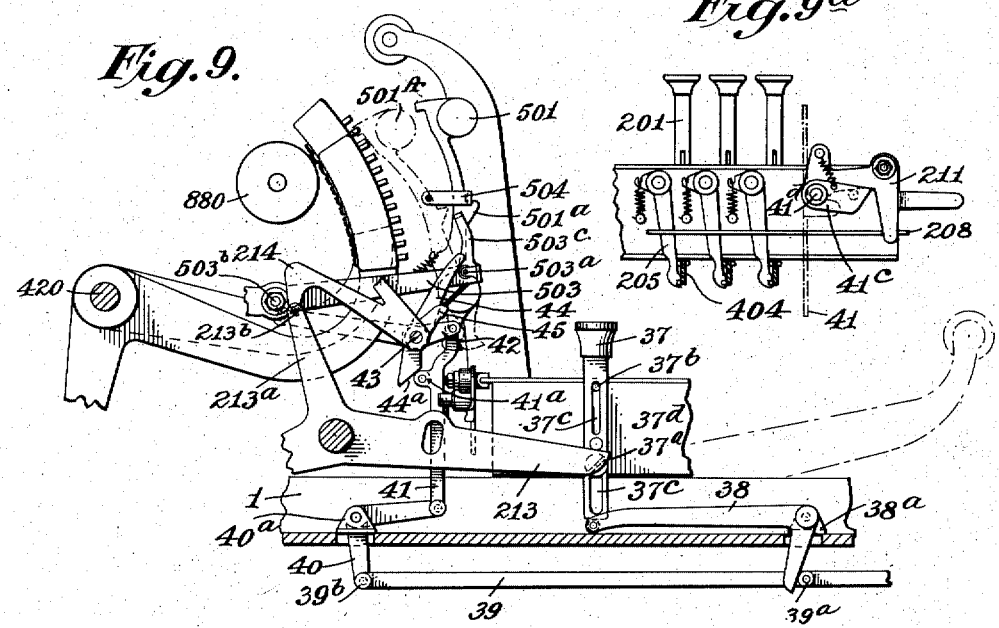
Fig. 9.
Fig. 9a.
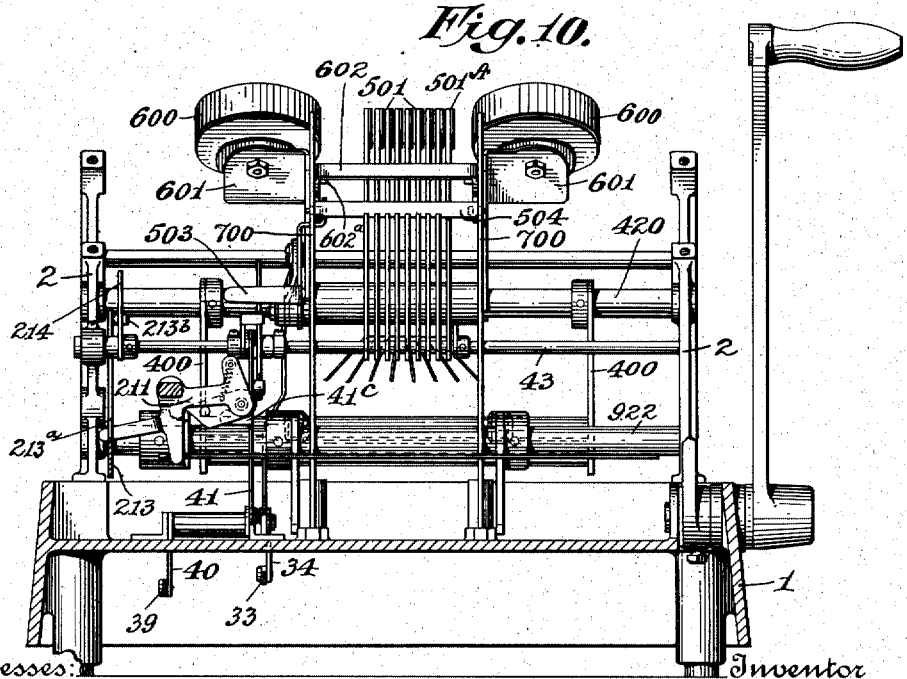
Fig. 10.
Witnesses:
Inventor
Heber C. Peters
By his Attorneys

H. C. PETERS.
CALCULATOR.
APPLICATION FILED JUNE 3, 1915.

1,255,821.

Patented Feb. 5, 1918.
12 SHEETS—SHEET 11.

Witnesses:

Inventor
Heber C. Peters
By his Attorneys

Attest: 3497s P

Fig. 20.

```
      * R
      * P
  165   P
  832   P
  460   P

1457s  P
    #   R

* P
  172   P
  451   P
  654   P

1277s  P
    #   R

* P
  113   P
  453   P
  197   P

763s  P
    #   P

3497s  P
```

Heber C. Peters, Inventor:

by _____ his Attys

UNITED STATES PATENT OFFICE.

HEBER C. PETERS, OF NEW YORK, N. Y.

CALCULATOR.

1,255,821.  Specification of Letters Patent.  Patented Feb. 5, 1918.

Application filed June 3, 1915. Serial No. 31,825.

*To all whom it may concern:*

Be it known that I, HEBER C. PETERS, a citizen of the United States, residing at New York city, county of New York, and State of New York, have invented new and useful Improvements in Calculators, of which the following is a specification.

My invention relates to calculating and listing machines equipped with more than one accumulator operable to obtain directly the arithmetical difference between two amounts and also recapitulate individual totals. Means are also provided whereby a printed list, bearing a complete record of the various operations and the order in which they occurred, is obtainable.

The machine disclosed and claimed in this application, is a variation of the broad principle described and claimed in my application, Serial No. 802,911, filed November 25, 1913, whereby subtraction of amounts accumulated upon an accumulator is secured by adding to said accumulation, the complement of another amount accumulated upon the other accumulator, another variation of said broad principle being also disclosed in my application Serial No. 844,150, filed June 10, 1914.

One object of my invention is to provide in a machine equipped with at least two accumulators, or registers whose adding wheels I preferably locate so as to be visible, means independent of the number keys for communicating to one accumulator through its actuators the complement of a registration appearing on another accumulator. This I accomplish by measuring or predetermining the extent of movement of the actuators preferably while they are disengaged from the accumulator on which appears the amount whose complement is being communicated to another accumulator. Provision is made for stepping all the actuators, except the actuator of lowest order, a distance equal to that required to register the difference between the digits of the number whose complement is being communicated and 9.

The actuator of lowest order is always stepped the distance required to register the difference between the digit appearing on the lowest order adding wheel and 10. Thus, in a machine arranged to compute by the decimal system, I arrange that each actuator above the units actuator shall move a distance equal to the difference between 9 and the figure appearing on its coöperating adding wheel in the accumulator bearing the number whose complement is sought, and that the units actuator shall move a distance equal to the difference between 10 and the figure on the units adding wheel in said accumulator. Thus there is set up in the actuators in one operation a single amount which is the complement of the number appearing on said accumulator. This complementary amount is then registered in the other accumulator. By the "complement" of a number, as referred to in this application, I mean the remainder obtained by subtracting that number from the maximum accumulating capacity of the machine plus 1. Means are provided preferably to prevent the printing of this complementary amount, a special designating sign only being printed when the operation of communicating the complement takes place.

By these means provided I can thus add to a minuend registration on one accumulator the complement of a substrahend registration on a second accumulator, and obtain directly on the minuend bearing accumulator the true arithmetical difference between the two registrations.

I can also communicate to and add together on one accumulator the complements of the various separate totals of the items originally registered on another accumulator. Then with the first accumulator reset to zero, the complement of this sum so obtained on the second accumulator is at will communicated to the first accumulator— this communicated amount being the true sum of the various separate totals which originally appeared on the first accumulator as will be fully explained presently. Thus, I am able to obtain a recapitulation of the separate totals by the use of only complementary amounts, since by the method I pursue the sum of the complements of two or more numbers equals the complement of the sum of those numbers.

It is obvious while performing recapitulation that the various separate totals and also their recapitulation will, as a consequence of the above operation, appear on the same accumulator. This recapitulation is obtained, it will be noted, without transferring these totals to another accumulator, which method I believe to be broadly new with me.

I provide means for printing only a special designating sign when either accumulator is reset to zero—the total or sum of the items not being printed. This operation of resetting the accumulator to zero I term clearing the accumulator, by which I mean the operation of resetting the number wheels to zero, and not an operation performed subsequently thereto. For convenience I prefer to print sums solely through the well-known operation of "sub-totaling" whereby the amount on the adding wheels remains thereon after the operation of printing takes place.

Means is provided for locking either accumulator in a wholly inactive position at will, said locking means being arranged so that when one accumulator is active the other accumulator is always wholly inactive during any partial or complete operation of the machine. Since amounts can be registered in an accumulator only when that accumulator is active, and since only one accumulator can be active during any one partial or complete operation of the machine, it is evident that when the operation of communicating takes place the accumulator on which appears the number whose complement is to be communicated must be inactive, and the other accumulator on which the complement is to be registered must be active. When said locking means is in a "half-way" or intermediate position both accumulators are rendered inactive and items listed then will not be accumulated. Such "non-add" or "eliminated" items may be distinguished by the special designation presently disclosed.

Since preferably only one accumulator is active at any one time, a single means only is necessary to control that movement of both accumulators which automatically governs the engagement and disengagement of each of the active accumulators with the racks. This construction secures a marked simplification in structure and operation valuable for both mechanical and manufacturing reasons, and which, I believe to be new in machines equipped with more than one accumulator and capable of performing the operation of recapitulation.

For convenient reference, it is desirable to identify on the printed list the accumulator which was active during any particular operation of the machine, and while this may be accomplished in various ways, I prefer to use a polychrome ribbon whose relative position to the printing line of the machine is shifted transversely when an accumulator is thrown into or out of action. The different operations in the various accumulators are thus contrasted in colors on the printed record. This arrangement requires but one set of designating signs for both accumulators, as the various designations of the operations will show in a color identifying the accumulator active at the time they were printed. Thus the structure and operation of my invention over machines of the prior art is further simplified.

When both accumulators are inactive, due to the half-way position of the locking means, the polychrome ribbon will be shifted transversely only to its midway position, and an amount then printed will show with its upper portion in one color and its lower portion in a contrasting color. By this double color "non-add" or "eliminated" items, referred to above, may be distinguished.

*Finding the arithmetical difference.*

Example 1.

| Keyboard | 1st accumulator P. | 2d accumulator R. |
|---|---|---|
| 165 P | | |
| 862 P | | |
| 450 P | 1477s P | |
| ——— | | |
| 197 R | | |
| 1162 R | | 2326s R |
| 967 R | | 9998523 |
| ——— | | ——— |
| | | 0000849 R |

Example 2.

| Keyboard | 1st accumulator P. | 2d accumulator R. |
|---|---|---|
| 160 R | | 160 |
| 197 P | 197 | |
| 860 R | | 860 |
| 1162 P | 1162 | |
| 450 R | | 450 |
| 967 P | 967 | ——— |
| ——— | ——— | 1470s R |
| | 2326s P | |
| | 9998530 = 9998520 + 10 | |
| | 0000856s P | |

Assume as a result of items listed totals appear in both accumulators and their arithmetical difference is desired. Since in my mechanism the adding wheels of both accumulators are visible, the relative value of the two totals is determined at a glance. The accumulator carrying the larger total is rendered active and the accumulator carrying the smaller total is simultaneously rendered inactive by a proper operation of the locking means, which movement also effects a transverse shifting of the polychrome ribbon by which the color distinguishing the active accumulator is brought to printing position. Then suitable mechanism, which will be described fully later, is operated to set up in the racks an amount which is the complement of the smaller total (on the inactive accumulator) which complement is added to the larger total, (on the active accumulator) the sum of these two amounts producing the arithmetical difference sought. This complementing amount is not printed but a special designating sign # in the color distinguishing the active counter is printed at the time indicating this operation has been performed.

In the examples given herewith and in Figures 17, 18, 19 and 20 I have assumed the machine to be equipped with a purple and red bichrome ribbon. To assist in making the description clear, I have distinguished by the letter P such items, sub-totals, and designating signs as would be printed in purple, and by the letter R such items, sub-totals, and designating signs as would be printed in red. Thus, if on one accumulator of seven columns capacity there is added consecutively amounts 165, 862 and 450 as a result of this there will appear in this accumulator a sum of 1477 (see Example 1, also Fig. 17) which may be printed as a sub-total and will be distinguished as such by the sub-total designating sign "s." It will also be printed in the color designating the counter active during the above operations. Then if by a proper operation of the locking means another accumulator is made active and there is added in this other accumulator 197, 1162 and 967 as a result of this a sum of 2326 will appear in the accumulator which may also be printed and designated as a sub-total. This, too, will be printed in the color distinguishing the active counter, which color will be different from that indicating the sub-total 1477 previously printed. On the printed record will then appear a group of items and its sub-total printed in one color and a second group of items and its sub-total printed in a contrasting color.

At a glance it is seen that the amount in the second accumulator exceeds the amount in the first accumulator and since it is desired to obtain the arithmetical difference between these two amounts, from the foregoing explanation, it will be evident that the complement of 1477 should be added to 2326 in order that this difference may be obtained. To accomplish this, the accumulator carrying the smaller total is locked in inactive position, and then by the operation of mechanism provided interference stops are placed in the paths of step plates mounted on the forward moving rack supports said step-plates being located so that the units rack moves forward three spaces; the tens rack moves forward two spaces; the hundreds rack five spaces and the thousands rack eight spaces. All other racks move forward nine spaces. There will thus be set up in the racks 9998523 which number is the difference between 1477 and the maximum accumulating capacity of the machine plus 1. This complementary amount is not printed. Only a special designating sign # in the color of the active counter is printed to show that the operation has taken place. On the return movement of the racks, by the mechanism provided, this complementary amount is added to 0002326 (on the active accumulator). The sum 998523 and 0002326 is 10000849. Since, however, the accumulators are of but seven columns capacity, the digit 1 at the extreme left will disappear, and on the active accumulator will appear only 0000849, which number is the arithmetical difference between 2326 and 1477. This remainder 849 can now be printed on the record slip and will appear as a sub-total in the color in which 2326 was printed. Thus, by my method, the remainder or balance always prints in the color corresponding to that in which the larger amount was printed. This enables the observer to determine readily whether the difference shown is a "debit" or a "credit" balance. It should be noted that in setting up the above complement 9998523 in the racks, the unit rack moves one point farther than the tens rack although the same digit 7 shows in both the units and tens column of the original number. This provision, when communicating a complement for always stepping the lowest order rack one space farther than would be required to register the difference between 9 and the figure appearing on the lowest order adding wheels is an important feature of my invention.

It is evident that the items and sums shown in Example 1 could be reversed in their relation to the counters concerned, that is, the larger amount could appear on the first accumulator and the smaller amount on the second accumulator. (See Example 2, also Fig. 18). This would mean that the color designations for items, sub-totals and designating signs would also be reversed and by this reversal of color a glance at the printed slip would enable the observer to see what had been done.

Also it is not compulsory in my device that items added in the accumulators be listed consecutively. By referring to Example 2 (also Fig. 18) 160 may be added in the second accumulator and would be printed on the record slip in the color distinguishing the second accumulator. Then by a proper operation of the locking means the first accumulator can be made active and the item 197 registered on the first accumulator; this would also be printed on the record slip but in the color distinguishing the first accumulator which contrasts with that in which 160 was printed. Similarly, the items 860, 1162, 450 and 967 can be interspersed, the color in which they are printed distinguishing the accumulator on which they were registered. As a result of this work, there will appear on the second accumulator 1470 which represents the sum of items registered on said second accumulator and there would appear on the first accumulator 2326 which represents the sum of the items registered on said first accumulator. Both these sums can be printed and designated as sub-totals by sign "s" in the color distinguishing the accumulator on which they are registered. Since it is desired to find the arithmetical difference between these two sums it is evident that the complement of 1470 should be added to 2326. In this case zero being in the units column, the units rack will advance ten spaces; the tens rack two spaces, the hundreds rack five spaces, and the thousands rack eight spaces; all other racks nine spaces.

There will thus be set up in the racks an amount such as might be represented by 9998520+10 which is the equivalent of 9998530. This added to 2326 in the first accumulator equals 0000856, which is the arithmetical difference desired. This provision, when communicating a complement, for moving the units rack to rotate the units wheel a complete revolution from zero to zero when zero appears on said units wheel is also an important feature of my invention.

*Example 3.*

Recapitulation.

|  | 1st accumulator P. | 2d accumulator R. |
|---|---|---|
| Keyboard | | |
| *P | | |
| 165 P | | |
| 832 P | | |
| 460 P | 1457s P | 9998543 |
| | | |
| *P | | |
| 172 P | | |
| 451 P | | |
| 654 P | 1277s P | 9998723 |
| | | 9997266 |
| *P | | |
| 113 P | | |
| 453 P | | |
| 197 P | 763s P | 9999237 |
| | 3497s P | 9996503 |

Let us assume that with an accumulator in active relation with the racks there are set up on the keyboard successively and accumulated amounts of 165, 832 and 460. These total 1457. By locking the above accumulator in inactive position, the complement of 1457 or 9998543 may be communicated to a second accumulator (rendered active when the first accumulator was made inactive). During this operation a designating sign # only, in the color of the active accumulator, is printed to show what has taken place. The second accumulator is then made inactive and the first accumulator active and reset to zero, a special designating sign * in the color of the first accumulator being printed to show that this latter operation has taken place. Similarly items 172, 451 and 654 are totaled in the first accumulator and the complement of their sum 1277 which is 9998723 is communicated to the second accumulator by the means and method described and added to the complement 9998543, the sum of these two making 9997266. This communicating operation is also indicated by the special designating sign # printed in the proper color. The first accumulator is again reset to zero, the designating sign * printed in its proper color showing what has been done. Continuing the operation of recapitulation, items 113, 453 and 197 beng added on the first accumulator totals 763 and its complement 9999237 is communicated to the second counter. The special designating sign # in the color distinguishing the second accumulator being printed to show this had been done. 9999237 added to 9997266 the sum already in the second accumulator equals 9996503. The first accumulator is now made active and reset to zero. The special designating sign * in the color distinguishing the first accumulator being printed to show this has been done. The complement of the sum appearing on the second accumulator, (now inactive) is then communicated to the first accumulator, the designating sign # in the proper color being simultaneously printed and which will be noted is in a contrasting color to that in which the previous communicating signs are printed. As a result of these operations there appears on the first accumulator 3497. This number 3497, it will be seen, is the sum of recapitulation of the separate totals 1457, 1297, and 763. (See Fig. 19). I thus secure a recapitulation of the various separate totals, which recapitulation appears in the same accumulator in which said separate totals were first registered, and this recapitulation has been obtained not by the transfer of totals as has heretofore been practised but by the communication of complementary amounts only.

While the order of operations for recapitulation described above assists in making clear my method, in actual practice I find it unnecessary to communicate the complement of the total of the last group of items to the second accumulator or to reset the first accumulator to zero. With the first accumulator active and the second accumulator inactive, I prefer to communicate to the total of the last group of items on the first accumulator the complement of the amount standing on the second accumulator, which sum is the recapitulation desired. Thus, if when 763 (see Example 3 and Fig.

20) appeared on the first accumulator, to it had been communicated the complement of 9997266 on the second accumulator (which is 2734) the sum of 763 and 2734 equaling 3497 the recapitulation desired, would appear on the first accumulator.

It will be evident from the above description, examples, and figures referred to therein that there appears on the printed list a complete record of all the operations performed shown in the order in which they occur. Thus the cancellation of an amount when the number wheels are reset to zero is shown by the special sign \*, the color in which it is printed identifying the accumulator whose number wheels were so reset. The items entered on the keyboard are printed in the order in which they are entered, the color in which they are printed indicating the accumulator active at the time and on which they would, therefore, be registered. A blank stroke of the machine (during which no work is performed) is indicated by a blank space between printed amounts or designations. The sum of items added in either accumulator is indicated by the designating sign "s," the color in which this sum and designating sign is printed identifying the accumulator affected. An amount communicated from one accumulator to another is indicated by the special sign # the color in which it is printed identifying the accumulator to which the amount was communicated. A "non-added" or "eliminated" item will show in a double color as fully described before. The net difference between two amounts or "balance" will be automatically printed in the color which identifies the accumulator upon which the larger of the two sums was registered. It is also evident that my use of designating signs is not confined merely to identifying amounts or the registering condition of the number wheels as has been the usual practice heretofore, but also serves to identify both cancellation and calculating operations of the machine which affect the registering condition of the accumulators, the amounts involved being prevented from printing on the record.

Figure 2:
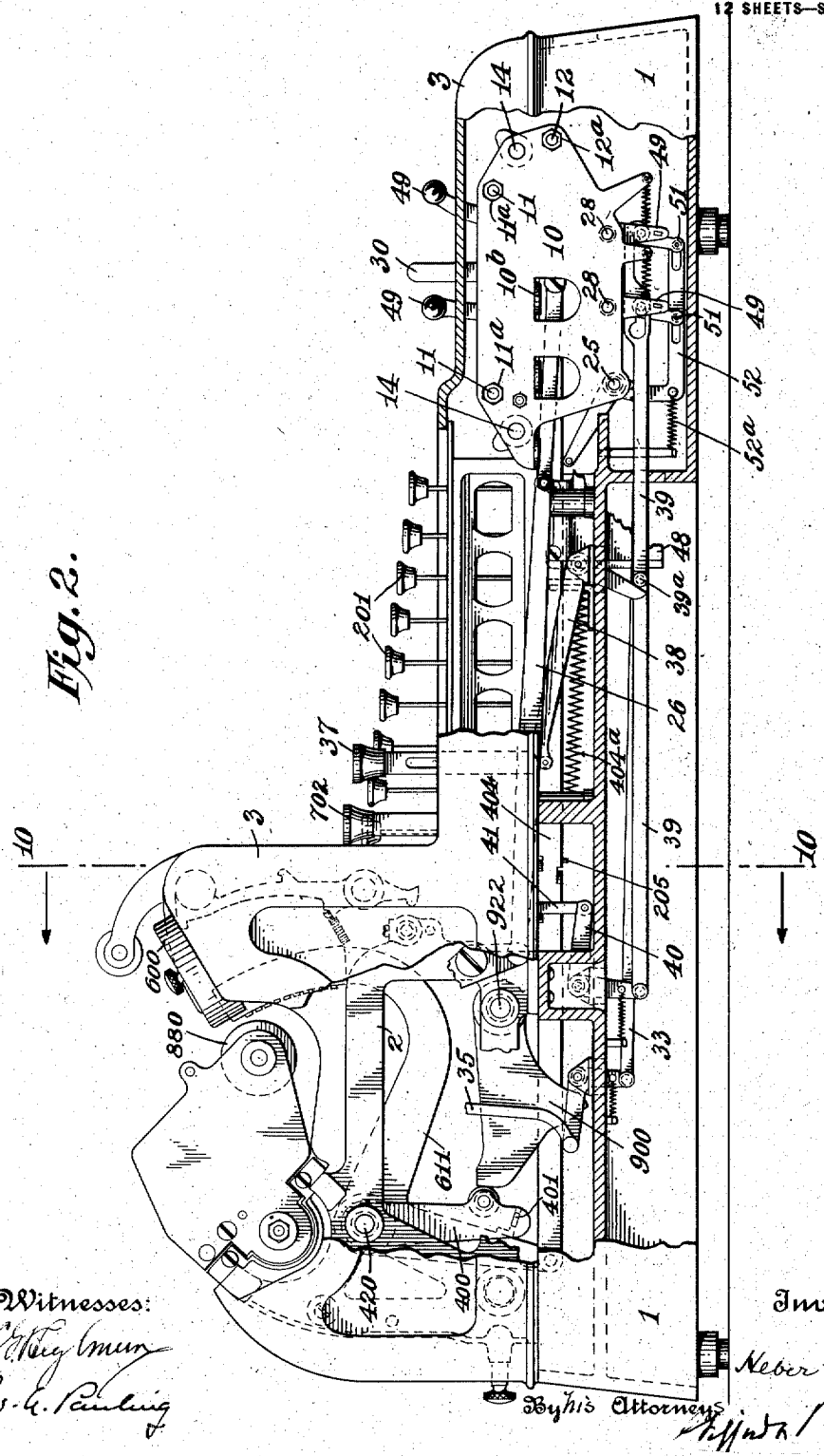

Fig. 1 is a plan view of a machine embodying my invention with portions of the case broken away, Fig. 2 is a side elevation of Fig. 1 showing some parts in vertical section.

Figure 3:
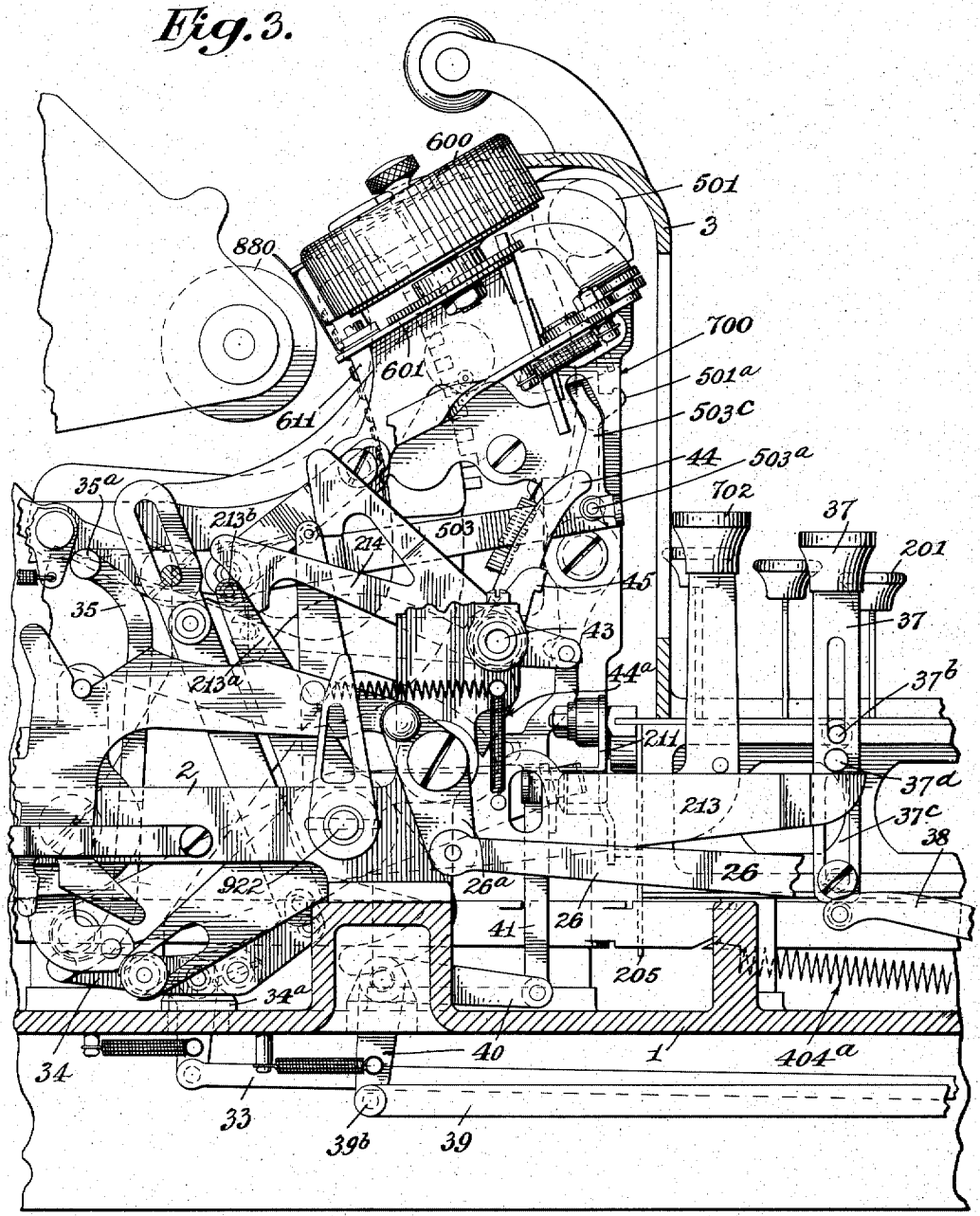
Figure 4:
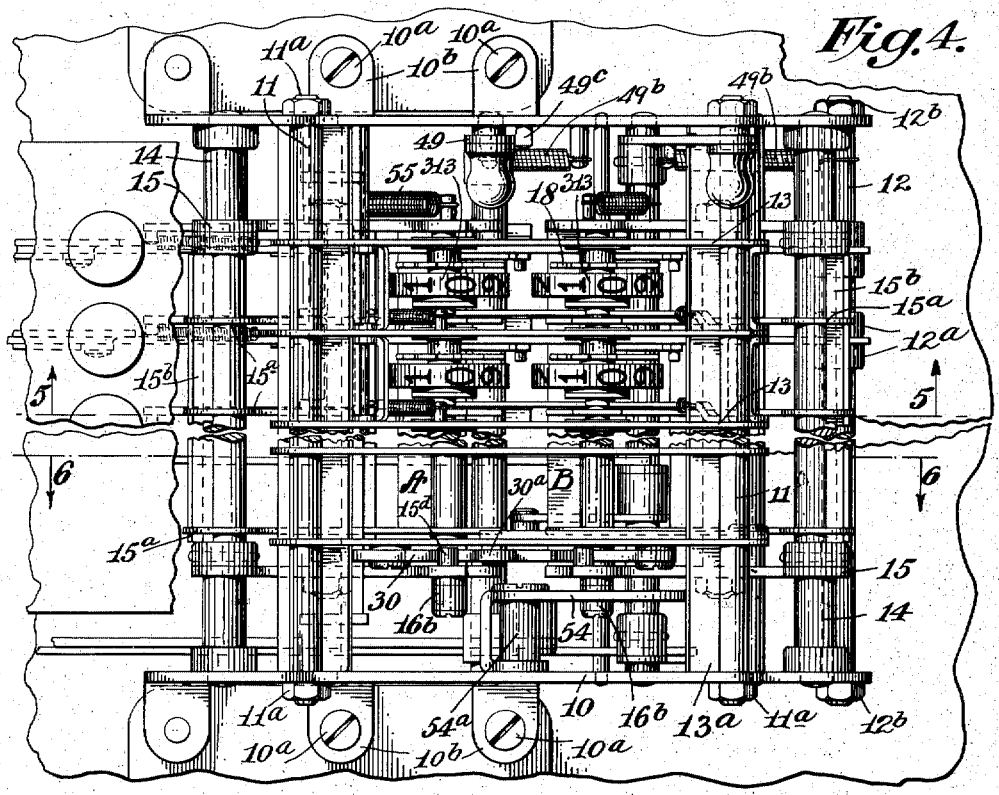
Figure 5:
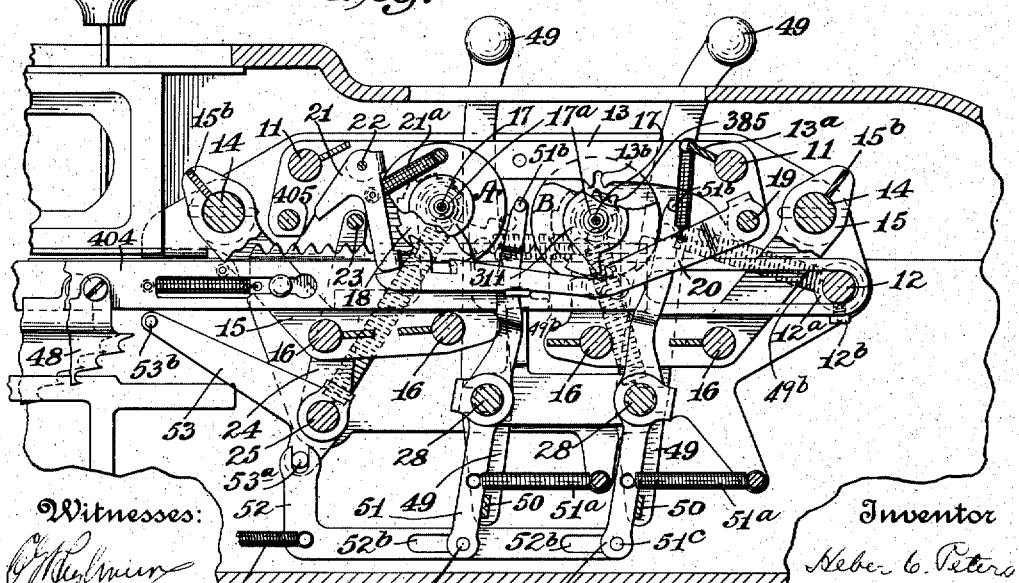
Figure 11:
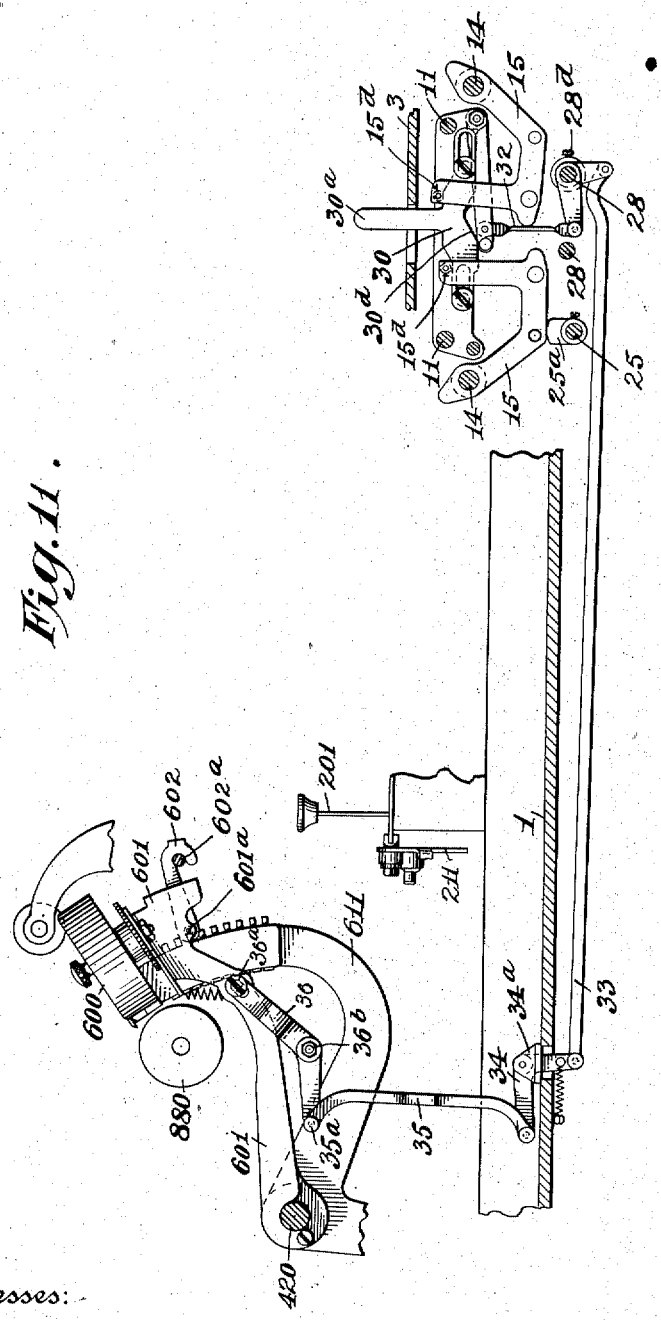
Figure 12:
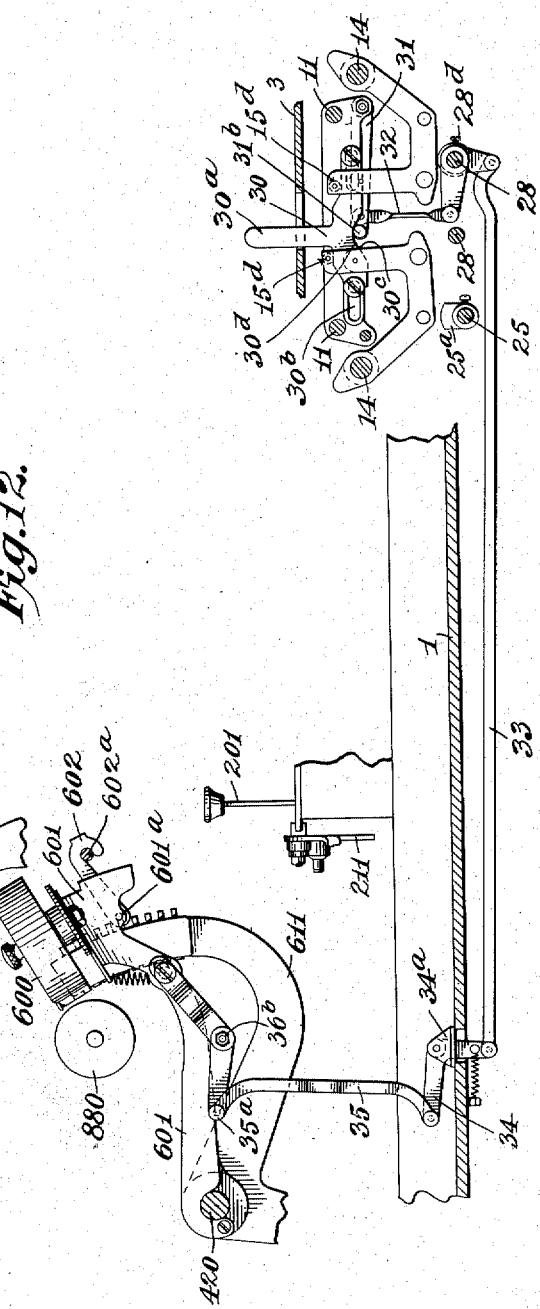
Figure 13:
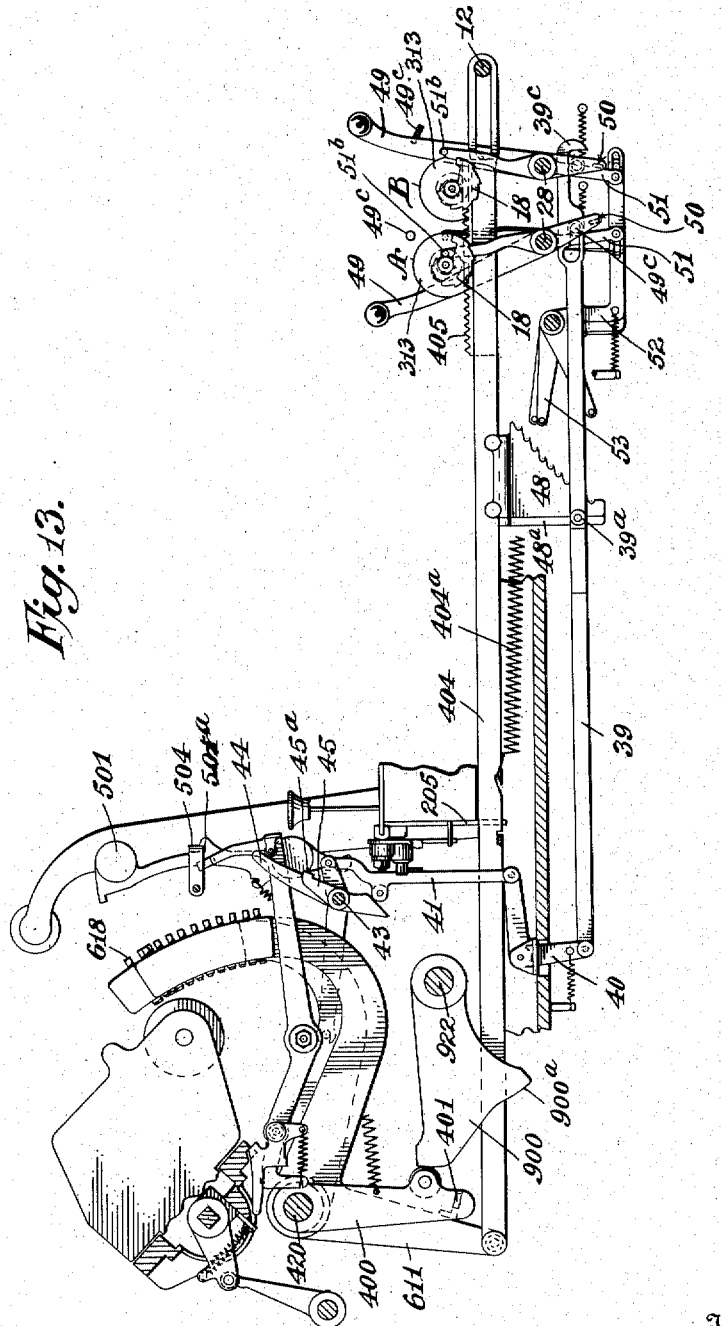
Figure 14:
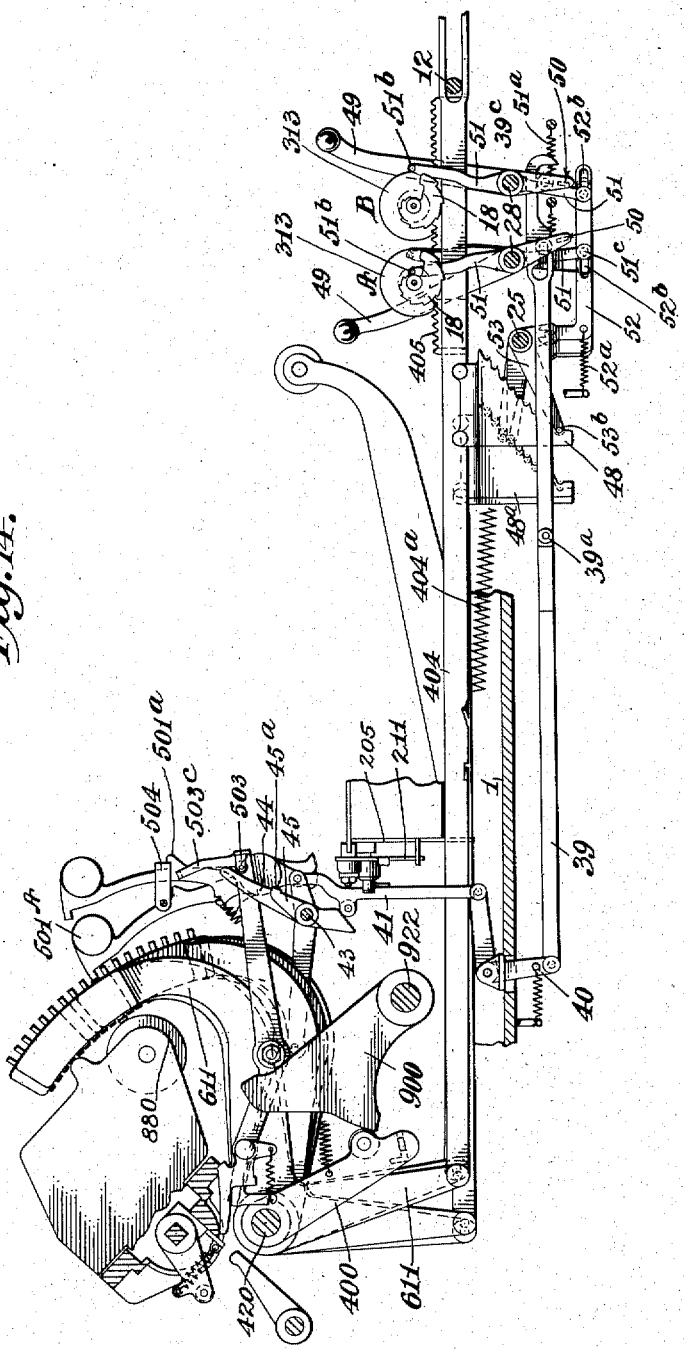
Figure 15:
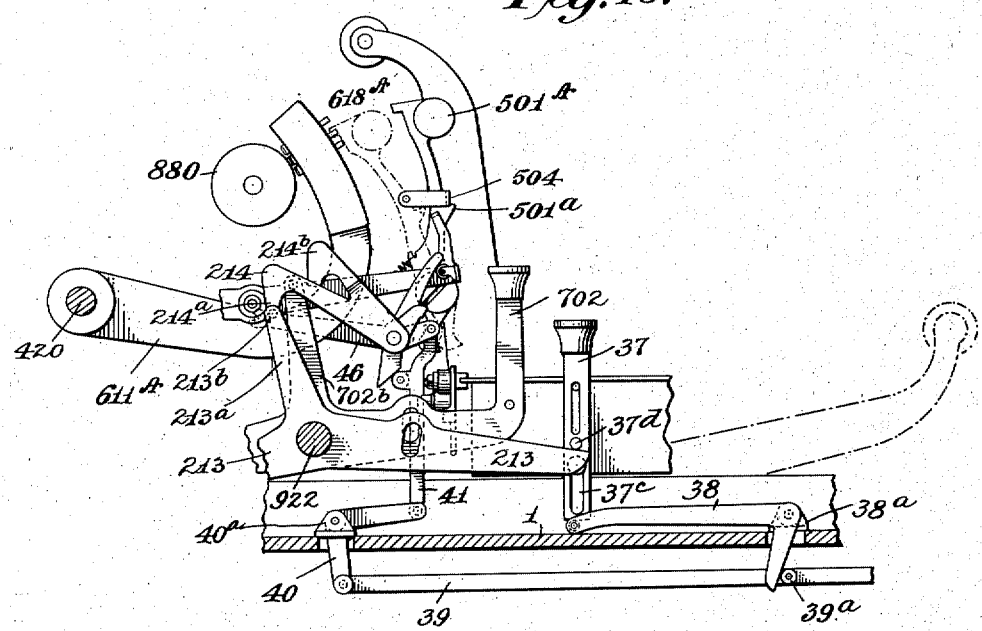
Figure 16:
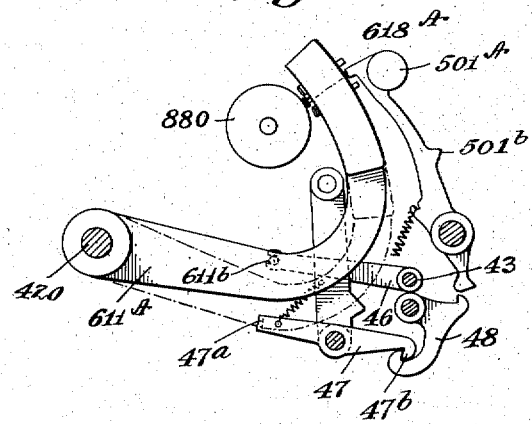

Fig. 3 is a side elevation on a larger scale and showing in greater detail parts shown only partially or wholly omitted in Fig. 2, Fig. 4 is a plan view of the accumulating mechanism shown in Figs. 5 and 6, Figs. 5 and 6 are vertical sections on the lines 5—5 and 6—6 respectively of Fig. 4 looking in the directions indicated by the arrows, Figs. 7 and 8 are detail views of the two accumulators or counters showing some of the parts in different operating positions, Fig. 7ª is a side view of one end of the rack, Fig. 9 is a side elevation in detail showing the position assumed by certain parts when the "cancellation" key is depressed, and before the operating lever has been operated. The dotted lines show position assumed by the designating sign type hammer and operating lever when the latter is moved to its forward position, Fig. 9ª is a rear view of a portion of the keyboard, Fig. 10 is a detail view in front elevation at about the line 10—10 of Figs. 1 and 2 looking in the direction shown by the arrows, Figs. 11 and 12 are side elevations, partly in section, of mechanism for controlling the ribbon shift when either accumulator is made active, Figs. 13 and 14 are side elevations, partly in section, illustrating the positions assumed by certain parts when the operation of communicating a complement takes place, Figs. 15 and 16 are side elevations illustrating in greater detail the control of the designating sign type sector by the operation of the sub-total and cancellation keys, Figs. 17 to 20, inclusive, are examples of printed operations performed by my invention.

*General arrangement.*

To aid in a ready understanding of my invention by those skilled in the art, and incidentally by way of demonstrating its adaptability to known types of adding machines, I have chosen to illustrate the same in the present instance as applied to a machine having the design of the one known and sold upon the market as the "Burroughs Visible," which machine corresponds in the main with that shown in Patent No. 763,692, issued June 28, 1904, on the invention of William Henry Pike, Jr.

I employ with slight alteration the base 1, side frame 2 and case 3 (Fig. 2) of said prior machine. The paper carriage which supports the platen 880 and the mechanism for moving and positioning this platen laterally or feeding it vertically, the sub-total key 702 and mechanism controlled by it, the amount keys 201 arranged in the usual denominational rows and supplying stops for limiting the movement of rack bars 404, detents 205 for said rack bars controlled by said number keys, means for restoring depressed number keys to normal, printing mechanism, the operating means and its connections, the means for compelling a "spacing stroke" before printing the sum of items listed, and other familiar and well known mechanism found in this type of machine, are all substantially in my machine identical with that embodied in said Burroughs Visible.

I employ substantially the ribbon mechanism found in said prior machine which consists of two ribbon spools 600 mounted on arms 601, said arms pivoting on shaft 420. These arms are enlarged at the end which supports the ribbon spool, a part of this enlarged portion being bent at right angles to the arm proper to afford the necessary support. A U-shaped rock frame 602 is supported at each end on studs 602$^a$, said studs being mounted in the side plates 700 (see Fig. 10). Each of the two arms of said frame 602 connects with studs 601$^a$ mounted in the arms 601 and serves to move arms 601 as a unit and thus operates to shift the ribbon spools 600, which movement shifts the ribbon transversely with respect to the printing line. The operation of shifting the ribbon is brought about by rocking the bell crank 36 which is connected with the arm 601 at 36$^a$, said bell crank being pivoted at 36$^b$ and having motion imparted to it through link 35, which link is connected to said bell crank at 35$^a$. The ribbon spools 600 are so positioned as to carry a bi-chrome ribbon in front of the type by the use of which impressions are printed on the paper. While the mounting of the ribbon spools and their location in the machine and general shifting operation is similar to that employed in the Burroughs Visible machine, I have determined, by proper mechanism, that this shifting of the ribbon shall take place simultaneously with the shifting of the accumulator control slide 30, the operation of which will be described more fully later.

I utilize the usual rack bars 404, somewhat lengthened and supported at their forward ends by a cross rod 12 and guided by collars 12$^a$ fixed to said rod by screws 12$^b$ (see Fig. 5). The usual racks 405, also lengthened to enable them to engage either accumulator, are mounted on said rack bars in the customary manner employed in machines of this kind. The rear end of rack bar 404 connects with type sector 611 in the usual manner, so that any movement of the rack bar will move the type sector a corresponding amount. Mounted on rack bars 404 and rigidly fixed thereto, one to each bar, are step plates 48, whose function will be fully described presently. Rack bars 404 tend to move forward under tension of spring 404$^a$ (see Figs. 2 and 3) but are restrained from so doing by the usual detents 205, controlled by the number keys and located at the rear of the keyboard. They are also restrained by the usual bail 401 mounted on arms 400, said arms being supported on shaft 420 and rigidly fixed thereto. Bail 401 co-acts with type sectors 611 (see Fig. 13) and is governed in its movement by cams 900 rigidly mounted on shaft 922. In said prior machine this cam allows the racks to travel a distance from 0 to 9 but, in order to secure the results I desire, I decrease the radial distance of the cam face 900$^a$ from the center of the shaft 922 so that the travel of type sector 611 is increased and the rack bar and likewise the racks are free to move one step farther when required. In my mechanism it is necessary for the units rack to move from 0 position to 10 position on occasion, and for this reason the above change is made.

The operation of the type hammers 501 is substantially that in said prior machine. The non-print mechanism is also substantially the same, the bail 504 being arranged to engage the detents 501$^a$ of the type hammers and prevent them from operating to print an amount. I have, however, modified the construction in the case of the one hammer 501$^A$ coöperating with the designating sign type, in that the detent 501$^a$ on this hammer is omitted, as shown at 501$^b$ in Fig. 16, and said hammer is thus free to act when the operation of the other hammers is prevented by bail 504.

*The accumulators.*

The accumulators operate by the familiar method in prior Burroughs machines whereby the adding wheels when accumulating items are disengaged from their actuating racks during said rack's forward movement on the first half cycle of the operation, and prior to the return movement of the racks, the adding wheels are engaged with said racks so as to be turned thereby when the racks are restored to their normal position. A "carry" from a lower order to the next higher order adding wheel is obtained by the familiar one step movement of the rack as in the well known Burroughs machine. Subtotals are obtained by the familiar method of engaging the racks and adding wheels and rotating the adding wheels backward to zero during the forward movement of the racks and continuing this engagement of the racks and wheels during the return movement of the racks so that the amount which appeared on the number wheels is restored thereto. I cancel an amount in either accumulator by rotating the adding wheels to zero, on the first half cycle of an operation while they are engaged with the racks, and then disengaging the racks and wheels while said wheels are at zero position, the racks being then returned to normal while the wheels remain at zero. I vary this operation, commonly known as "taking a total," by preventing the printing of the amount standing on the adding wheels at the time, allowing only a designating sign to be printed.

For the accommodation of the two accumulating sections which I have designated as A and B, I extend the front part of the casing and correspondingly extend the supporting frame work (see Figs. 1—7—8) so that the two sets of registering wheels may stand one just in rear of the other; the top of the casing being slotted at 9 as shown in Fig. 1, so that the numbers of both sets of wheels are visible. To the right and left of the accumulating sections and mounted on base 1 are sub-frames 10 (see Figs. 2—4) which are fastened to base 1 by screws 10ª. Screws 10ª clamp ears 10ᵇ to the base, said ears 10ᵇ being an integral part of the sub-frames 10 being bent at right angles to the sub-frame proper. Connecting the sub-frames are cross rods 11 (see Figs. 2—4—5) and rod 12. These rods and sub-frames are clamped together by nuts 11ª and 12ᵇ respectively. Supported on rods 11 are gear detent plates 13 (see Fig. 5) which are located a uniformly proper distance apart by separator strips 13ª. On the detent plate 13 is the gear detent 13ᵇ whereby any rotation of the registering wheels of the accumulator when disengaged from the racks is prevented. Supported in sub-frames 10 and journaled therein are two shafts 14. Supported by these shafts and rigidly fixed thereto are side plates 15 (see Figs. 4—5) and partition plates 15ª which are located a uniformly proper distance apart by separator strips 15ᵇ. Rods 16, of which there are four, extend through the division plates 15ª and side plates 15, and serve with the separator strips 16ª to form a rigid frame for the support of the registering wheels of the accumulating sections, which frames pivot on shafts 14 in the journals provided in sub-frames 10, which arrangement allows said frames to be rocked when the adding gears are moved in and out of mesh with the racks. Shafts 17 are supported in the side plates 15 and division plates 15 and 15ª respectively, and on them are mounted the usual adding wheels, each consisting of a numeral disk 313, a ten-tooth gear wheel 385, and a snail cam 311, as shown in Pike 763,692. In addition to these, however, I include a graduated cam, or step cam 18, (see Figs. 4—13—14) which has particularly to do with the operation of my device and whose function will be fully described later. These four pieces 313, 385, 311 and 18 are mounted on a common sleeve 17ª and are pinned together for rotation as a unit, the sleeves 17ª rotating freely on shafts 17. The depending ears at the front end of detent plates 13 afford a support for a shaft 19, which passes through all these plates 13. Loosely mounted on shaft 19 are levers 20 which perform the same function as levers 303 illustrated in Pike 763,692, but in my machine they have been extended and lengthened so that they co-act with the snail cams 311 of both accumulating sections A and B. Each lever 20 is held normally in position under tension of spring 20ª, its upward movement being arrested at its rear end by contact with the face of latch 21. Each latch 21 is supported on a shaft 22, said shaft being supported in the detent plates 13. The lower end of latch 21 tends to move forward under tension of spring 21ª, this forward movement being restrained by contact with a shouldered stop on end of lever 20. When lever 20 is depressed, however, the latch 21 is free to move to the second shoulder stop on lever 20, and in this position it holds lever 20 depressed. (See Figs. 7 and 8.) Latch 21 is restored to its rearward or normal position by the movement of bail 23, which is supported at each end by arms 24, said arms being mounted on and rigidly fastened to shaft 25. The movement of the bail is accomplished by the backward and forward movement of the long connecting link 26 which is actuated by the mechanism which controls the in and out of mesh movement of the accumulators with the actuators. This movement of link 26 causes roll 26ª to contact with arm 24 (see Fig. 6), this contact moving the arm 24 rearward and thus moving the bail 23 rearward. Bail 23 contacts with the depending arm 21ᵇ of latch 21, and moves it from the position shown in Fig. 8 to that shown in Fig. 7 and thus restores it to normal and with it the lever 20. When registering wheel passes from its 9 to its 0 position, it is arranged that the toe 311ª of the snail cam 311 shall contact with the ear 20ᵇ and move said arm downward against the tension of spring 20ª. This downward movement of arm 20 carries with it ear 20ᶜ, said ear 20ᶜ projecting in an opposite direction from the arm 20 than do the ears 20ᵇ. The ear 20ᶜ normally forms a detent for the rack 405 of next higher order and acting to arrest said rack one step short of its maximum travel by contact with the step stop 405ª (see Fig. 7ª). Since the rack bars 404 move rearward this additional one step distance, it is evident that the spring 460 (one end of which is connected to the rack 405 and one end to the rack bar 404) will be put under tension. Removing the interference of 20ᶜ from rack 405 will, therefore, permit the rack to advance the additional one tooth step when the lever 20 is depressed by the snail cam 311 of the adjacent lower order adding wheel and in this manner provision is made for "carrying" a unit to the wheel of next higher order when the adjacent wheel of lower order has completed a revolution. To prevent overthrow of arm or lever 20 through the action of snail cam 311, I provide a stop 27 mounted on shafts 28, the projecting end of which 27$^a$ is located to co-act with the lower face of ear 20$^c$ of lever 20.

Counter control slide.

At the left of the machine and supported by shafts 11, I provide a plate 29 (see Figs. 6—11—12) on which is mounted the accumulator control slide 30. This slide in appearance resembles an inverted T. The arm 30$^a$ projects upward through the case, and furnishes the operator with a means for moving the slide 30 backward and forward, at will. The slots 30$^b$, in said slide 30, fit on studs 29$^a$ mounted in plate 29, and make this movement possible. Slide 30 has two cam faces 30$^c$ on its upper side and a cam face 30$^d$ on its lower side (see Figs. 6 and 12). Each cam face 30$^c$ co-acts with a stud 15$^d$ mounted in the side plate 15 of each accumulator frame. As slide 30 is moved in one direction, the co-action of cam faces 30$^c$ with studs 15$^d$ rock both accumulators, the effect being to disengage and raise one accumulator from the racks and lock it in a wholly inactive position, whereas the other accumulator is simultaneously lowered, engaged with the racks and assumes an active position. Therefore, it is evident that through the control slide 30 only one accumulator can be active at one time, and thus in effect my machine operates always as a simple single counter machine because at no time is there more than one accumulating section in active relation with the racks during any partial or complete cycle of operation of the mechanism. When the control slide is moved to a half-way position, both accumulators will be in a partially raised position and both will be out of active relation with the racks. When this occurs, it is evident that items listed will not be added in either accumulator.

The lower cam face 30$^d$ of slide 30 co-acts with the roll 31$^b$ of the arms 31. Arm 31 pivots on stud 31$^a$, said stud being mounted in plate 29 (see Fig. 6). The back and forth movement of slide 30 thus moves the free end of arm 31 up and down, and with it the link 32 connected thereto. This in turn will rock the bell crank 32$^c$ pivoting on shaft 28 which in turn will move back and forth the long connecting link 33 by its connection to bell crank 32$^c$. Link 33 is connected at its rear end with bell crank 34 and link 35 connects it in turn with bell crank 36. Bell crank 36 has a forked end which straddles stud 36$^a$, said stud being mounted in the arm 601 of the ribbon carrier. It will thus be clear that as the slide 30 is moved back and forth to move a counter into active or inactive position, such movement of slide 30 at the same time affects the position of the ribbon supporting means, and through the connections just described, the rocking of bell crank 36 will move the ribbon carrier 601, and through it the ribbon spools 600 will be shifted so that there is brought to printing position one or the other of the contrasting colors of the bi-chrome ribbon, said color identifying the counter active at the time. Should the slide 30 be moved to its half-way position, at which position both accumulators are inactive, it will be evident that the ribbon will also be shifted only half way, and items printed at the time will show part in one color and part in a contrasting color, and by this double color, items which have been listed but have not been accumulated may be readily identified.

Cancellation key.

At 37 (see Fig. 9) I provide a cancellation key by the operation of which the registering wheels of either accumulator may be reset to zero without printing the amount standing on the wheels. Key 37 is mounted on the side plate 200 of the keyboard, being supported by screw stud 37$^a$ and stud 37$^b$, the slots 37$^c$ permitting an up and down movement of the key. Projecting at right angles to face of key 37 is a stud 37$^d$ which contacts with the lever 213. Depressing lever 213 sets ready for action the usual mechanism for returning the registering wheels to zero, as in the operation commonly known as "taking total". Depressing key 37 acts also, however, to rock bell-crank 38 which is mounted on base 1 by bracket 38$^a$, this rocking movement being produced by the lower end of key 37 coacting with the stud 38$^b$ on the end of the longer arm of bell-crank 38. This motion is imparted to long link 39 by the co-action of the shorter arm of bell crank 38 with the roll 39$^a$ mounted on link 39. This movement of link 39 by its connection at 39$^b$ rocks bell crank 40 mounted on base 1 by bracket 40$^a$, said movement in turn moving the connecting link 41 upward. Link 41 is pivoted at its upper end with rock arm 42, which is loosely mounted on shaft 43, its only purpose being to supply a guide and support for the upper end of link 41. A roll 41$^a$ is mounted on link 41, which roll contacts with the cam surface 44$^a$ of lever 44, said lever 44 being loosely mounted on shaft 43 and co-acting at its upper end with the roll 503$^a$ which is mounted on arm 503, said arm being pivoted at 503$^b$ and is a portion of the mechanism for controlling the "non-print" device of said prior machine. Thus when the link 41 is raised by the depression of key 37, the roll 41$^a$ contacting with the cam surface 44$^a$ of lever 44 rocks the lever 44 and its upper end co-acting with the roll 503$^a$ depresses lever 503 and removes the upward projecting finger 503$^c$ of lever 503 from contact with bail 504, allowing said bail 504 to rock downward and engage detents 501$^a$ of type hammers 501. In this way the type hammers are prevented from acting, and while thus restrained, no printing will take place. By the means described, I prevent the printing of the amount appearing on the registering wheels when they are returned to zero, and at the same time a hammer 501ᵃ is actuated to print a designating sign as will now be described.

*Designating signs.*

Rigidly fixed to shaft 43 is a rock arm 46 (see Figs. 15 and 16) the free end of which is forked and straddles stud 611ᵇ of the type sector 611ᴬ carrying the designating sign type 618ᴬ, of which three are employed, i. e., "s" "*" and "#". Said type sector by the motion of rock arm 46 is moved upward a varying degree governed by the extent of the partial rotation of shaft 43, and there is thus brought to printing position one of the type 618ᴬ. The lifting of sector 611ᴬ allows the end 47ᵃ of the latch 47 normally depressed to rise, and this movement lowers the end 47ᵇ of said latch so that it engages the detent of latch 48 and on the further operation of the machine (by mechanism provided in said prior machine) the hammer 501ᴬ is released and striking rearward causes the designating sign to be printed on the slip.

The depression of the sub-total key 702 (see Figs. 15 and 16) rocks the arm 702ᵇ (which is an integral part of 702) so that its extreme end contacts with the arm 214 (which is an integral part of 214ᵇ rigidly mounted on shaft 43). This will partially rotate the shaft 43. Whenever the cancellation key is depressed, the stud 37ᵈ coacting with the top edge of lever 213 (see Figs. 3—15) partially depresses said lever, and the arm 213ᵃ which forms a part of 213 moves the stud 213ᵇ to co-act with cam face 214ᵃ of rock arm 214, thereby again partially rotating shaft 43, but to a different degree than when the sub-total key was depressed. Fixed rigidly to shaft 43 is rock arm 45 (see Figs. 13 and 14) which has a projecting ear 45ᵃ bent at right angles. Said ear 45ᵃ co-acts with the face of lever 44 so that when the lever is rocked, a partial rotation of the shaft 43 is effected. The communicating levers 49 through their connection with the link 39 to which they impart motion when operated, as will be presently described, through the link 41 and the lever 44 and rock arm 45 act to impart rotative movement to shaft 43, but in a degree different from that produced either by the sub-total or cancellation keys. Thus it will be seen that operating the sub-total key, the cancellation key or the communicating levers cause shaft 43 to be partially rotated, but each in a different degree, and there is thus brought to printing position by the mechanism described, a designating sign type which identifies on the printed list the particular operation taking place at the time.

*Counter rocking cam.*

Mounted on sub-frame 10 is a cam 54 which pivots on studs 54ᵃ (see Figs. 4 and 6) and whose back and forth movement raises and lowers the accumulating section A or B made active at the time by the position of slide 30. Cam 54 at its lower end has two depending fingers 54ᶜ of hooked form, each finger having a cam surface 54ᵇ so formed as to co-act with roll 16ᵇ on shaft 16, said shaft projecting beyond side plate 15, a distance sufficient to effect the engagement of said parts. The back and forth motion of cam 54 is controlled by the long link 26, one end of which is connected to cam 54 and the other to the rock arm 26ᵃ (see Fig. 3) said rock arm being connected with the counter controlling mechanism of said prior machine. When a counter or accumulator is in its lowered or active position, a back and forth movement of the handle, moves the cam 54 so that the cam face 54ᵇ on the rearward movement of said cam 54 engages roll 16ᵇ and lifts the active accumulating section, pivoting on shaft 14, upward against the tension of spring 55 (see Fig. 4). This movement lifts the adding gears out of mesh with the racks. The forward movement of cam 54, on the return movement of the mechanism, drops the gears into mesh with the racks, the stop piece 25ᵃ on shaft 25 and 28ᵈ on shaft 28 (see Fig. 11) limiting this downward movement. The other accumulator being held in an upward position by slide 30 is rendered inactive (see Fig. 6) and therefore the back and forth movement of cam 54 has no effect to rock it while so locked, because the cam roll 16ᵇ is, in the upper position of the accumulator, out of operative contact with the cam face 54ᵇ of the depending finger 54ᶜ which rocks this accumulator when active. By shifting the control slide 30 to its opposite position, this action of cam 54 with respect to the accumulators rocked will be reversed.

*Communicating.*

At 49 (Figs. 5, 13 and 14) I provide communicating levers, each having a long arm and a short arm, each lever being mounted rigidly on a shaft 28. At the opposite end of each shaft 28 from the lever 49 thereon is a rock arm 49ᵃ which corresponds identically with the short arm of lever 49 (see Fig. 6) said rock arm 49ᵃ being fixed to shaft 28. Connecting each lever 49 with its associated rock arm 49ᵃ is a bail 50 (see Figs. 6, 13 and 14) which contacts with the lower ends of lever 51, (Figs. 13 and 14) loosely mounted on shaft 28, said bail operating to move said levers against the tension of springs 51ª. The power required to accomplish this is supplied by springs 49ᵇ (see Fig. 4) the tension of which serves to hold the long ends of levers 49 normally in a forward position against stops 49ᶜ mounted on sub-frame 10. It will be understood that when the long end of lever 49 is moved rearward, the bail 50 will move forward and the levers 51 will be moved under the tension of springs 51ª so that the upper ends of said levers 51 will move rearward until pin 51ᵇ located at the extreme upper end of lever 51 contacts with step cam 18, the distance moved being determined by the particular face of step cam 18 which has been moved into the path of pin 51ᵇ by the rotation of the adding wheel unit. This movement of lever 51 will cause its lower end to move forward and carry with it a slide 52, said slide being supported on studs 51ᶜ fixed to levers 51, said studs being fitted to the slots 52ᵇ of said slide, said slots affording the necessary lost motion so that slide 52 can be moved by one lever 51 independently of the other co-acting lever 51. (See Fig. 14.). Each slide 52 is normally held in a rearward position by tension of a spring 52ª, the upper end of said slide being at a right angle to its main portion and said upper end of the slide being forked so as to straddle stud 53ª mounted in the short arm of a bell crank 53, the latter being loosely mounted on the shaft 25. This forward movement of the slide 52 tends to depress the long arm of the bell crank 53 a distance proportional to the movement of said slide; this distance or movement of the slide being determined by the particular face of the step cam 18 in the path of stud 51ᵇ. At the end of the long arm of bell crank 53 is a stud 53ᵇ; this will be positioned in the path of step plate 48, by the above described means, when the communicating lever 49 is moved rearward and will determine by the contact of studs 53ᵇ and step plate 48 the distance which the rack bars 404, and likewise the racks 405, can move forward. It should be noted that the adding wheel sections, carrying the step cam 18, which co-act with the stud 51ᵇ to produce this result, always belong to the accumulator which is locked in inactive position. To compel a proper operation in this respect, I have provided an arm 55 mounted on the rock shaft 28 which by interference with the shaft 16 prevents the moving of the communicating lever associated with the particular accumulator which is in a lowered or active position. (See Fig. 6). The movement of lever 49 also moves the link 39 through contact with stud 49ᶜ with the forward end of link 39 at 39ᶜ, the slot or the hook on this link 39 affording the necessary lost motion for the independent operation of link 39 by either of the two levers 49. This movement of link 39 through the connections already described will release the rack bars 404 from control of detents 205, through the contact of the ear 41ᶜ of link 41 with stud 41ᵈ. Said ear is bent at right angles to said link and during the upward movement of said link contacts with the stud 41ᵈ mounted on the rack release bell crank 211 of said prior machine. (See Fig. 9ª). Said movement rocks the bell crank 211 which moves the release bar 208 which in turn moves the rack bar detents 205, thus releasing said rack bars allowing them to move forward on the further operation of the machine. Link 41 also throws the non-print mechanism into action by the contact of roll 41ª against face 44ª of lever 44 which rocks said lever and causes its upper end to contact with roll 503ª thus depressing lever 503 and removing the support 503ᶜ from bail 504. This allows bail 504 to engage hammer detents 501ª which will prevent the hammers 501 from operating. There will also be brought to printing position the designating sign identifying the operation of communicating a complement.

The position of the faces of step cam 18 in relation to the number wheels is such that when 0 shows on the wheel, the step of shortest radius from the center of shafts 17, is rotated to the position where the stud 51ᵇ of lever 51 can contact with said step of shortest radius. When 9 shows on the wheel the cam step of greatest radius is so positioned for contact with said stud 51ᵇ. This arrangement provides that when zero is shown on the number wheels the racks will have their greatest travel, and that when 9 is shown the racks will have their least travel, due to the fact that the more stop 53ᵇ is lowered the later steps of plate 48 will contact with it, and the greater is the movement of the rack bars 404, and likewise the racks 405. On plate 48 are ten shoulders, one for each digit. The upper shoulder nearest the rack bar is so positioned (in all but the units column) that it contacts with the stud 53ᵇ, (when stud 53ᵇ is positioned so that said contact can take place) before the rack has moved forward at all. The second shoulder will allow the rack to advance one step. The third shoulder will allow the rack to advance two steps and so on, the lowest or tenth shoulder allowing the rack to advance nine steps. In the units column the plate 48ª is positioned on its associated rack bar one step farther rearward than are the plates 48 of the higher orders. The upper shoulder of plate 48ª (see Figs. 13 and 14) when contacting with stud 53ᵇ, said contact occurring when the units number wheel shows at 9, will thus allow the units rack to advance one step. The second shoulder will allow the rack to advance two steps, and so on. The lowest or tenth shoulder will contact with the stud 53$^b$ when the units wheel shows 0 and will allow the units rack to move forward ten steps. From the above it will be seen that the relation of step cams 18 to the digits on the number wheels is of a complementary character, and that the operation of lever 49 will position stops 53$^b$ so that on the further operation of the machine the step plates 48 will move forward and contact with stops 53$^b$, and thus there will be set up in the racks the difference between the number appearing on the number wheels and 9 in all but the units column.

Since by my mechanism I desire in the units column to set up in the racks the difference between the number appearing on the units wheel and 10, I vary the above arrangement by setting the units step plate 48$^a$ one step farther back than are the other step plates of the higher order column, as has been described. This arrangement allows the units rack to advance the difference between the number appearing on the units wheel and 10. Thus, should 9 appear on the units wheel the rack advances one step. Should 0 appear on the units wheel, the rack advances ten steps. In a higher order column should 9 appear on the number wheel the co-acting rack would advance not at all, and should 0 appear on the number wheel the co-acting rack would advance nine steps. In this way, I set up in the racks the complement of a number appearing in one accumulator which is, during the return of the racks to their normal position added in the other accumulator. By retaining the proper communicating lever 49 in the communicating position and repeating the communicating operation until the amount appearing upon the dividend set of counters is less than the amount registered on the divisor set of counters, division may be effected.

*Operation.*

From the foregoing description it will be now understood that I first determine which accumulator shall be active by shifting the control slide 30 to its proper position. Then by depressing the canceling key and operating the machine, the number wheels of the active accumulator will be reset to zero, and at the same time the cancellation sign * identifying this operation, will be printed in the color identifying the active counter. I can then list items as in Fig. 17 by the usual method of depressing the number keys and working the operating mechanism, the listing appearing on the active accumulator only. These items will be printed in the color of the counter in which they were accumulated and which counter must necessarily have been active at the time. When the sum of the items is desired, a blank or spacing stroke of the machine is first made, during which no keys are depressed. Then the sub-total key is depressed and held depressed while the machine is operated, which causes the sum to be printed on the slip in the color identifying the active counter. A designating sign "s" identifying this sum as a sub-total also is printed at the time.

I can then shift the slide 30 into its opposite position, which movement will also shift the ribbon transversely and cause the designating signs, items, and sums now to be printed to appear in a color contrasting with that in which the first set of designating signs, items and sub-totals appeared. Having obtained the second list of items and sub-total by the same operations performed in connection with the first set of items, a glance at the counters shows which accumulator carries the larger amount. If it is desired to find the difference between the two sub-totals, it is only necessary to shift the slide 30 so that the accumulator carrying the smaller amount is locked in inactive position. Then the lever 49 adjacent to this inactive accumulator is moved rearward and held in such position while the machine is operated through a complete cycle. The designating sign # identifying the operation of communicating a complement in the color of the active counter will only be printed, the complementary amount being prevented from printing. This operation will communicate to the accumulator carrying the larger amount, the complement of the smaller amount on the other accumulator, with the result that the larger amount standing on the wheels of the first accumulator will be reduced an amount equal to the number standing on the second accumulator, and there will then remain on the first accumulator the arithmetical difference between the two original amounts. After a spacing stroke is taken this difference is printed as a sub-total and indicated as such by the designating sign "s" and will appear in the color identifying the accumulator from which it was obtained. This being the accumulator originally carrying the larger amount, it is evident that "balances," or the difference between the two sums, will always be printed on the slip in the color the same as that in which the larger amount was printed.

When a recapitulation is desired, the number wheels of both accumulators are reset to zero, two cancellation signs * appearing at the top of the list in contrasting colors showing that these operations were performed. A series of items is then listed as shown in Fig. 20 and the sum of these items printed and indicated as a sub-total in the color of the counter active at the time. The slide 30 is then moved to its opposite position, and the complement of the sum is communicated in the manner described to the other counter, the designating sign # which identifies this operation printed in a contrasting color to that in which the sub-total was printed. The slide 30 is now shifted to the position it occupied originally, and the wheels of the first counter restored to zero through the operation of the canceling key, as has been described, the cancellation sign * being printed at the time. A new series of items is now listed, and their sum accumulated in the first counter. The operations of printing this sum as a sub-total and also communicating its complement to the second counter is repeated. The designating signs, printed in their proper color, showing this has been done. There will be in the second accumulator now the sum of the two complements. A last series of items is now listed and added and their sum printed as a sub-total in the usual manner. In the last series I vary the operation by communicating to the first counter, on which now appears the sum of the series of items just listed, the complement of the amount appearing on the second counter, on which has been accumulated the sum of the complements of the preceding sub-totals. This operation produces in the first counter the "grand total" which is the recapitulation of the separate sub-totals and which is the result sought. The designating sign # identifying this last communicating operation, it will be noted, appears in a color contrasting to that in which the other like designating signs have appeared, thus indicating clearly that the usual order of communicating an amount was reversed with respect to the counters affected. Printing the grand total or "recap" on the slip as a sub-total in the usual manner, completes the operation.

While I have shown and described a preferred embodiment of means and mechanisms for carrying out my invention I desire it understood that my invention is not limited to such means and mechanisms, as they may be varied, or other embodiments employed without departing from my invention as defined in the appended claims.

What I claim and desire to secure by Letters Patent of the United States is:—

1. In a calculating machine, in combination two accumulators, means for controlling the registrations on one accumulator by the registrations on the other accumulator, printing mechanism including bi-chrome means individual to said accumulators and means for rendering one of said accumulators active, said means operating simultaneously to bring to the printing point the color identifying said active accumulator.

2. In a calculating machine, in combination two accumulators, means for controlling the registrations on one accumulator by the registrations on the other accumulator, printing mechanism including bi-chrome means individual to said accumulators and means for rendering one of said accumulators active and the other inactive said means operating to bring to the printing point the color identifying the active accumulator.

3. In a calculating machine, in combination two accumulators, means for controlling the registrations on one accumulator by the registrations on the other accumulator, a platen, a printing mechanism, coöperable therewith, a bi-chrome ribbon, a slide member for simultaneously rendering one accumulator operable and the other inoperable and means controlled by the slide member for determining the color position of said bi-chrome ribbon relative to the printing point to indicate which of said accumulators is operable irrespective of operations performed thereby while operable.

4. In a calculating machine, in combination, two accumulators, means for controlling the registrations on one accumulator by the registrations on the other accumulator, a platen, printing mechanism coöperable therewith, a bi-chrome ribbon having colors individual to said accumulators, manually operated means for rendering one of said accumulators active and the other accumulator inactive, and means for automatically shifting said bi-chrome ribbon to bring to the printing point the color individual to the rotatable accumulator.

5. In a calculating machine, in combination, two accumulators, means for controlling the registrations on one accumulator by the registrations on the other accumulator, a platen, a printing mechanism coöperating therewith, a polychrome ribbon, a slide member for rendering one of said accumulators active and the other inactive and means controlled by said slide member for determining the position of the said polychrome ribbon relative to the printing point.

6. In a calculating machine, in combination, two accumulators, means for controlling the registrations on one accumulator by the registrations on the other accumulator, a platen, printing mechanism coöperating with said platen, a bi-chrome ribbon, manually operated means for rendering one of said accumulators non-rotatable and the other rotatable, and means for shifting said bi-chrome ribbon relative to the printing point in accordance with the rotatability or non-rotatability of said accumulators.

7. In a calculating machine, in combination, two accumulators, means for controlling the registrations on one accumulator by the registrations on the other accumulator, a platen, printing mechanism coöperating therewith, a polychrome ribbon having colors individual to said accumulators, means for rendering one of said accumulators active and the other accumulator inactive and mechanism controlled by said means for bringing to the printing point the color individual to the active accumulator.

8. In a calculating machine, a printing mechanism including a cancellation sign, a plurality of accumulators, means for rendering one of said accumulators active and another inactive, a cancellation member, and means whereby said cancellation member clears the active accumulator and simultaneously controls said printing mechanism to print said cancellation sign only.

9. In a calculating machine, in combination, a plurality of accumulators, a plurality of printing members, an independent printing member bearing an arbitrary sign, means whereby said plurality of printing members print amounts registered on any of said accumulators, means for communicating an amount standing upon one accumulator to another accumulator, and means operated by said communicating means for operating said independent printing member to print said arbitrary sign.

10. In a calculating machine, a printing mechanism including a cancellation sign, a plurality of accumulators, a polychrome ribbon having colors individual to said accumulators, means for rendering one of said accumulators active and another inactive, a cancellation member, means whereby said cancellation member clears the active accumulator and simultaneously controls said printing mechanism to print said cancellation sign only, and means whereby said cancellation sign appears in a color distinctive of the cleared accumulator.

11. In a calculating machine, a printing mechanism including a cancellation sign, a plurality of accumulators, a polychrome ribbon having colors individual to said accumulators, means for rendering one of said accumulators active, a cancellation member, means whereby said cancellation member clears the said active accumulator, and simultaneously controls said printing mechanism to print said cancellation sign only, and means whereby said cancellation sign appears in a color distinctive of said cleared accumulator.

12. In a calculating machine, a printing mechanism including a cancellation sign, a plurality of accumulators, means for rendering one of said accumulators active, a cancellation member, and means whereby said cancellation member clears said active accumulator, and simultaneously permits said printing mechanism to print said cancellation sign only.

13. In a calculating machine, in combination, two accumulators, a plurality of printing members, an independent printing member bearing an arbitrary sign, a movable polychrome ribbon, means whereby said plurality of printing members print amounts registered upon either of said accumulators, means for communicating an amount standing upon one accumulator to the other accumulator, and means controlled by said communicating means for operating said independent printing member to print said arbitrary sign and to move said polychrome ribbon to indicate to which of said accumulators said amount has been communicated.

14. In a calculating machine, in combination, an accumulator, a plurality of printing members, an independent printing member having an arbitrary sign, cancellation means for clearing said accumulator, means whereby amounts registered on said accumulator are printed by said plurality of printing members, and means whereby said independent printing member only is operated when said accumulator is cleared.

15. In a calculating machine, in combination, two accumulators adapted to accumulate independent totals and to perform in conjunction with one another calculating operations involving the communication of amounts or their complements, a plurality of sign printing members, an independent member bearing an arbitrary sign, means whereby said plurality of printing members are operable to print amounts registered on either of said accumulators, and means whereby said independent printing member is operated when an amount is transferred from one accumulator to the other.

16. In a calculating machine, in combination, a plurality of accumulators, a plurality of printing members, an independent printing member bearing an arbitrary sign, means whereby said plurality of printing members print amounts registered on any one of said accumulators, means for communicating the complement of a registration on one accumulator to another accumulator, and means controlled by said communicating means for operating said independent printing member to print said arbitrary sign.

17. In a calculating machine, in combination, a printing mechanism, a plurality of accumulators, a polychrome ribbon having colors individual to said accumulators respectively, means for placing both accumulators in inactive condition, and means controlled in accordance with the position of said accumulators for printing an indication appearing in part of each individual color.

18. In a calculating machine, in combination, a plurality of accumulators, printing mechanism, an independent printing member carrying an arbitrary sign, cancellation means for clearing said accumulators, and means for printing said arbitrary sign only when performing the said clearing operation.

19. In a calculating machine, in combination, two sets of registering wheels and their transfer or carrying mechanisms, of means for communicating to one set of wheels the complement of a registration standing upon the other set of wheels, and printing mechanism including means for printing an arbitrary sign only to identify said communicating operation.

20. In a calculating machine, in combination, two sets of registering wheels and their transfer or carrying mechanisms, of means for communicating to one set of wheels the complement of a registration standing upon the other set of wheels, and printing mechanism for printing registrations made upon either set of registering wheels and including means for printing an arbitrary sign identifying said communicating operation.

21. In a calculating machine, in combination, an accumulator, a plurality of printing members, an independent printing-member bearing an arbitrary sign, means whereby amounts registered on said accumulator are printed by said plurality of printing members, a cancellation key, and means operated thereby to hold said printing members against operation and permitting operation of said independent printing member when said cancellation key is operated.

22. In a calculating machine, in combination, a plurality of accumulators, printing mechanism including a plurality of printing members, an independent printing member bearing an arbitrary sign, means whereby amounts registered on either of said accumulators are printed by said plurality of printing members, a polychrome ribbon, a cancellation key for clearing either of said accumulators, and means controlled by the cancellation key for causing said independent printing member to print said arbitrary sign in a color distinctive of the accumulator cleared.

23. In a calculating machine, in combination, printing mechanism, a plurality of accumulators, means for simultaneously rendering one of said accumulators active and another inactive, means for printing operations of the active accumulator in a record having a distinguishing characteristic, means for communicating from the inactive accumulator to the active accumulator a number constituting the complement of the registration on the inactive accumulator, and means for printing an arbitrary sign indicative of said communicating operation.

24. In a calculating machine, in combination, two accumulators, means for simultaneously rendering one of said accumulators rotatable and the other non-rotatable and means controlled by the rotated position of the non-rotatable accumulator for communicating to the rotatable accumulator the complement of a number on the non-rotatable accumulator.

25. In a calculating machine, in combination, a plurality of accumulators, means for simultaneously rendering one of said accumulators active and the other inactive, means for communicating the complement of a number on the inactive accumulator to the active accumulator, and means for printing an arbitrary sign indicating said communicating operation.

26. A calculating machine, in combination, a plurality of accumulators, means for communicating the complement of the registration on one accumulator to another accumulator, and a printing mechanism for printing an arbitrary sign only indicating said communicating operation.

27. A calculating machine, in combination, a printing mechanism, a plurality of accumulators, means whereby said printing mechanism prints registrations made on said accumulators, means for communicating the complement of a number on one of said accumulators to another of said accumulators, and means whereby said printing mechanism prints an arbitrary sign solely indicating said communicating operations.

28. In a calculating machine, in combination, a plurality of accumulators including registering wheels, rack bars, racks thereon for actuating said wheels, means for placing one of said accumulators in operative relation to the racks and the other out of operative relation to said racks, means controlled by the inactive accumulator for measuring the extent of movement of the racks, step plates carried by the rack bars coöperating with said means, the step plate on the units rack bar being spaced rearward of the step plates on the other rack bars a distance to permit the units rack bar to advance one step farther than any other rack bar coöperating with any accumulator wheel of higher order on which appears the same digit as that appearing on the units wheel.

29. In a calculating machine, in combination, a plurality of actuating racks, a plurality of accumulators movable into and out of driving engagement with said racks, and a slide having cams for controlling the movement of the accumulators alternately into and out of engagement with the racks, and positively holding the inactive accumulator in inactive position.

30. In a calculating machine, in combination, two accumulators, means for controlling the registration on one accumulator by the registration on the other accumulator, a platen, printing mechanism coöperating therewith, a polychrome ribbon, a member for rendering one of said accumulators operable and the other inoperable and means controlled by said member for determining the position of said polychrome ribbon relative to the printing point.

31. In a calculating machine, in combination, two accumulators, means for rendering either accumulator active or wholly inactive at will, and means coöperable with one accumulator while inactive to diminish a registration on the other active accumulator.

32. In a calculating machine, in combination, two accumulators upon either of which amounts may be registered; number keys for effecting registrations on said accumulators; printing mechanism; means whereby the true complement of the number appearing on one accumulator can be communicated to the other accumulator as a single amount, independently of the number keys, said means simultaneously and automatically preventing the printing mechanism from printing the amount so communicated.

33. In a calculating machine, in combination, two accumulators upon either of which amounts may be registered; number keys for effecting registrations upon either of said accumulators; printing mechanism; means whereby the true complement of a number standing upon either accumulator may be communicated to the other as a single amount independently of the number keys, said means simultaneously and automatically preventing the printing mechanism from printing the amount so communicated.

34. In a calculating machine, in combination, two accumulators upon each of which amounts may be registered; number keys for effecting registrations on said accumulators; printing mechanism; a single means other than the number keys by the operation of which the registration on the accumulator is diminished by the addition in a single amount of the true complement of the registration standing upon the other accumulator, said means simultaneously and automatically preventing the printing mechanism from printing the amount diminishing said registrations.

35. In a calculating machine, in combination, two accumulators upon either of which amounts may be registered; number keys for effecting registrations on either of said accumulators; printing mechanism; a single means other than the number keys by the operation of which the registration upon either accumulator is diminished by communicating to it in a single amount the true complement of the number standing upon the other accumulator, said means simultaneously and automatically preventing the printing mechanism from printing the amounts diminishing said registration.

36. In a calculating machine, in combination, a plurality of accumulators on which amounts may be registered, number keys for effecting registrations on said accumulators, printing mechanism including a special designation, a single means other than the number keys, by the operation of which the registrations on each accumulator are effected, said means simultaneously and automatically preventing the printing mechanism from printing the amounts affecting said registrations but permitting the printing of said special designation.

37. In a calculating machine, in combination, a plurality of accumulators on which amounts may be registered, printing mechanism including a special designation, a polychrome ribbon, means operating to affect registrations on the accumulators and preventing operation of the printing mechanism to print the amounts affecting said registrations but permitting the printing of said special designation in a color identifying the accumulator active at the time.

38. In a calculating machine, in combination, two sets of adding wheels, sets of graduated cams associated with said wheels, and means coöperable with the cams on one set of wheels and operable to diminish the registration on the other set of wheels.

39. In a calculating machine, in combination, two sets of adding wheels, sets of graduated cams associated with said wheels, and means coöperable with the cams on one set of wheels and operable to diminish the registration on the other set of wheels, and means for identifying this operation.

40. In a calculating machine, in combination, two sets of adding wheels, sets of graduated cams associated with each set of wheels, printing mechanism, a polychrome ribbon, means coöperable with one set of cams and operable to diminish the registration on the other set of wheels, and means for operating said printing mechanism to print a record in the color identifying the set of wheels, the registration of which is diminished.

41. In a calculating machine, in combination, two accumulators, printing mechanism including means to print records in colors respectively identifying each accumulator, a single means for placing both accumulators in wholly inactive position, and means whereby said printing mechanism prints a multicolored record indicating that both accumulators are inactive.

42. In an adding machine two accumulators, means for rendering one accumulator operable and the other inoperable in combination with means for effecting registrations on the operable accumulator under control of the inoperable accumulator, together with printing means adapted to print a character identifying this operation.

43. In an adding machine two accumulators, means for rendering one accumulator operable and the other inoperable in combination with means for effecting registrations on the operable accumulator under control of the inoperable accumulator, a polychrome ribbon adapted to be moved to bring to printing position a color identifying the operable accumulator together with printing means adapted to print a character identifying this operation.

44. In an adding machine two accumulators, means for rendering one accumulator rotatable and the other non-rotatable in combination with means for effecting registrations on the rotatable accumulator under control of the non-rotatable accumulator, together with printing means adapted to print a character identifying this operation.

45. In an adding machine two accumulators, means for rendering one accumulator rotatable and the other non-rotatable in combination with means for effecting registrations on the rotatable accumulator under control of the non-rotatable accumulator, a polychrome ribbon adapted to be moved to bring to printing position a color identifying the rotatable accumulator together with printing means adapted to print a character identifying this operation.

46. In an adding machine, a rack and two units wheels operating to engage said rack in combination with means operating on occasion during a subtracting operation of the machine to move the rack, under control of either units wheel disengaged from the rack, one point beyond its normal maximum movement and means to engage the other units wheel with the rack to receive a registration corresponding with this movement of the rack.

47. In a calculating machine, the combination with a single keyboard mechanism; a single printing mechanism; and a polychrome ribbon shiftable to bring one or another of its color fields opposite the printing line; of a plurality of sets of independently operable accumulating counters, two sets at least being visible; drive means for the sets of counters; means to select one set of counters for operation and maintain another set out of operation; ribbon shift mechanism controlled by the counter-selecting means, whereby amounts set up on the keyboard may be registered on one or another of the sets of counters, and always printed in colors appropriate to the respective sets of counters on which the amounts are registered; and selective mechanism to control the counter drive means to enable the mechanical determination of the difference between larger and smaller amounts registered on any two sets of counters, normally idle sign-printing mechanism rendered effective by the selective mechanism which controls the counter drive means, to print a sign in the color appropriate to the set of counters from which the amount is subtracted to indicate the quotient; and means also controlled by the last named selective mechanism to prevent the imprint of the subtracted amount.

48. In a calculating machine, the combination with a plurality of sets of visible counters, operable independently of each other; means to accumulate a dividend and a divisor on any two sets of counters; normally operative mechanism to print amounts registered on the respective sets of counters, including polychrome inking means; counter-selecting mechanism to determine the set of counters on which amounts shall be registered, such counter-selecting means adapted to also control the position of the color fields of the inking mechanism relatively to the printing line, whereby amounts registered on the respective counters are printed in contrasting colors, so that the color in which an amount is printed designates the set of counters in which such amount was registered; selective mechanism to enable the operator to reduce the amount registered on any set of counters by the amount registered on any other set of counters; normally idle sign-printing mechanism; and means controlled by the last named selective mechanism to prevent the actuation of the regular printing mechanism and permit the actuation of the sign-printing mechanism to print a sign at each reducing operation, in the color appropriate to the counter bearing the amount which is being reduced, the number of signs thus printed representing the number of reducing operations, and indicating the quotient and the counter from which the amount or amounts were withdrawn.

49. In a calculating machine, the combination of a plurality of sets of independently operable, visible counters; means to set up and accumulate amounts on the respective sets of counters at will and in any order, including means to select the set of counters on which registrations are to be made; means to effect the subtraction of a subtrahend amount registered on any one set of counters from a minuend amount registered on any other set of counters; printing mechanism to record the amounts as registered, including polychrome inking means whereby amounts registered on one set of counters are always printed in a color contrasting with that in which amounts registered on another set of counters are printed; sign-printing mechanism; means controlled by the subtracting means to disable the amount-printing mechanism, and set the sign-printing mechanism to print a sign at each subtracting operation, the number of signs thus printed representing the quotient; and the amount, if any, which remains on the minuend set of counters, constituting the remainder; and totaling mechanism adapted to print such remainder, if any, said remainder being printed in the color appropriate to the minuend set of counters.

50. In a calculating machine, the combination of a plurality of sets of independently operable visible counters; means to set up and accumulate amounts on the sets of counters in any sequence and at will; means to subtract the subtrahend amount registered on any one set of counters from the minuend amount registered on any other set of counters while maintaining the subtrahend amount intact on the subtrahend set of counters; and means to print a designating sign only at each subtracting operation, the number of such designating signs constituting the quotient, the subtrahend amount representing the divisor and the minuend amount prior to the first subtracting operation, representing the dividend, any amount remaining on the minuend set of counters after the operation of division, constituting the remainder.

In testimony whereof I have hereunto signed my name in the presence of two subscribing witnesses.

HEBER C. PETERS.

Witnesses:
M. E. McNINCH,
C. G. HEYLMUN.